United States Patent [19]

Walker et al.

[11] Patent Number: 4,827,510

[45] Date of Patent: May 2, 1989

[54] MINIMIZATION OF AMPLITUDE GAPS IN A LINE-SPIN SCRAMBLED VIDEO SIGNAL

[75] Inventors: Robert H. Walker, Tarzana; Du Monte O. Voigt, Rancho Palos Verdes; Andrea L. Yeiser, Signal Hill, all of Calif.

[73] Assignee: TRW Inc., Redondo Beach, Calif.

[21] Appl. No.: 831,941

[22] Filed: Feb. 24, 1986

[51] Int. Cl.[4] .............................................. H04N 7/167
[52] U.S. Cl. ........................................ 380/14; 380/17
[58] Field of Search .............................. 380/14, 17, 11

[56] References Cited

U.S. PATENT DOCUMENTS

| | | | |
|---|---|---|---|
| 4,070,693 | 1/1978 | Shutterly | 380/14 |
| 4,575,754 | 3/1986 | Zohar | 380/17 X |
| 4,605,961 | 8/1986 | Frederiksen | 380/14 |
| 4,633,310 | 12/1986 | Gautier | 380/14 |
| 4,663,659 | 5/1987 | Blatter | 380/14 |

FOREIGN PATENT DOCUMENTS

| | | | |
|---|---|---|---|
| 2144298 | 2/1985 | United Kingdom | 380/17 |
| 8404013 | 10/1984 | World Int. Prop. O. | 380/17 |

Primary Examiner—Stephen C. Buczinski
Assistant Examiner—Linda J. Wallace
Attorney, Agent, or Firm—Noel F. Heal; Sol L. Goldstein

[57] ABSTRACT

A method and related apparatus for selectively line spin scrambling, reversing and inverting certain video lines or video segments to minimize amplitude gaps in a line-spin scrambled video signal and for unscrambling the line-spin scrambled video signal. The method for minimizing the amplitude gaps in the line-spin scrambled video signal involves measuring various amplitude differentials, prior to line spin scrambling, between certain points along the active portion of each video line. The values of the various amplitude differentials are then compared to a preselected value and, depending on which amplitude differential is less than or equal to the preselected value, the video line is line spin scrambled, reversed or left unchanged and one of the video segments is inverted or reversed to reduce the amplitude gap in the scrambled video line to at least the preselected value.

36 Claims, 4 Drawing Sheets

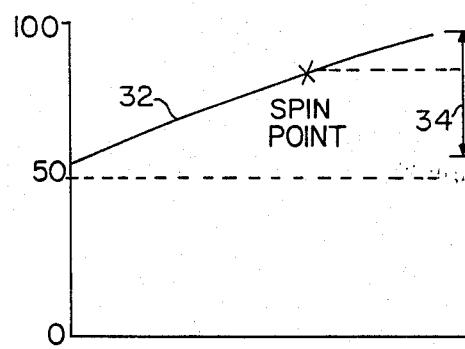
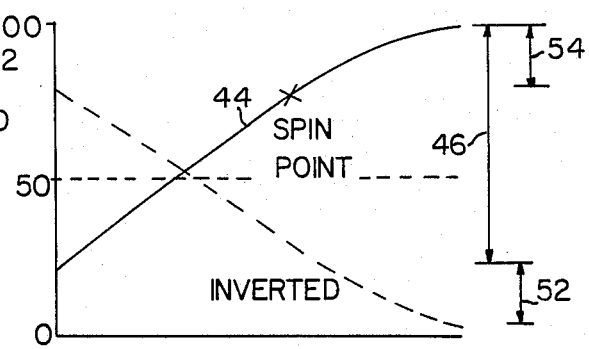
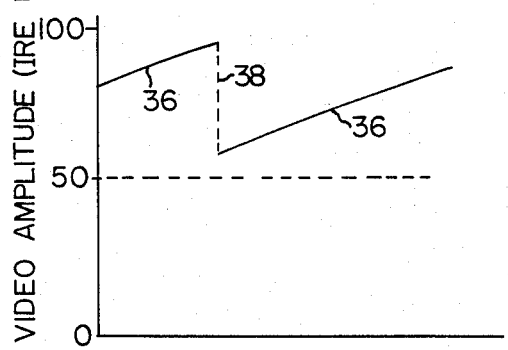
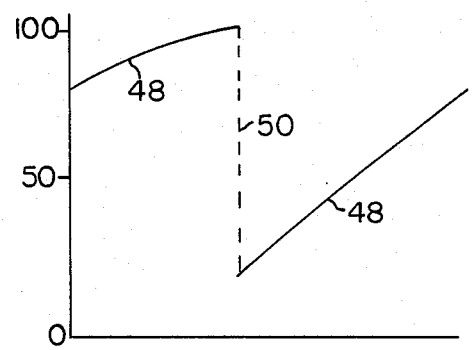
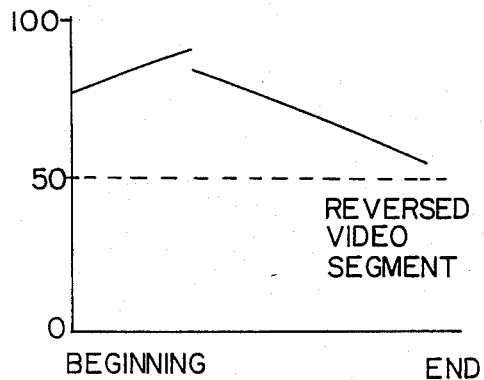
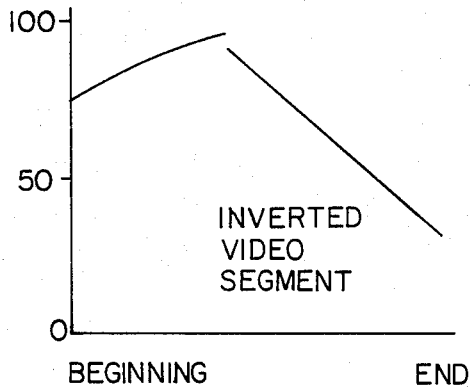

MINIMIZATION OF AMPLITUDE GAPS IN A LINE-SPIN SCRAMBLED VIDEO SIGNAL

BACKGROUND OF THE INVENTION

This invention relates generally to techniques for scrambling and unscrambling a video signal and, more particularly, to techniques for reducing distortions in a video signal caused by scrambling the video signal.

Secure transmission of video signals is becoming increasingly important with the growing popularity of video teleconferencing, cable TV and satellite TV transmissions, and with the advent of direct-broadcast-satellite (DBS) transmission. Various techniques have been developed that provide varying levels of video security, with corresponding levels of complexity and cost. One technique that provides a relatively secure video signal with a modest amount of complexity and cost is line spin, or line rotation, scrambling. A typical line spin scrambling system is disclosed in U.S. Pat. No. 4,070,693 to Shutterly.

Line spin scrambling is performed in an encoder by segmenting the active portion of a video line at a breakpoint determined by a pseudorandom number generator. The two segments are then interchanged, or "rotated," while the horizontal and vertical synchronization and blanking intervals are left intact. After transmission and reception of the video signal, the signal is unscrambled in a decoder by reversing the line spin scrambling that was performed in the encoder. The breakpoint is determined in the decoder by an identical pseudorandom number generator that is synchronized with the pseudorandom number generator in the encoder.

Although line spin scrambling offers many advantages, it has certain disadvantages, one of which is an amplitude gap or discontinuity that appears at the point in the scrambled video line where the two segments are pieced together. The amplitude gap results from an amplitude differential between the beginning and the end of the active portion of the video line, prior to line spin scrambling. In other words, the amplitude gap results from a difference in amplitudes measured at the beginning and the end of a video line prior to scrambling, since, after scrambling, these two amplitudes are positioned at the breakpoint. Because the amplitude gap provides information about the location of the breakpoint of the scrambled video line, an unauthorized viewer could unscramble the scrambled video signal by detecting the amplitude gap in each scrambled video line. Furthermore, transmission and reception of the line-spin scrambled video signal causes a distortion in the scrambled video signal in the vicinity of the discontinuity, because of the finite bandwidth of conventional television transmission and reception systems and the very high frequency content of a discontinuity. Accordingly, there has been a long existing need in the broadcasting industry for a method and apparatus for minimizing the amplitude gaps or discontinuities in a line-spin scrambled video signal. The present invention clearly fulfills this need.

SUMMARY OF THE INVENTION

The present invention resides in a method and related apparatus for selectively line spin scrambling, reversing and inverting certain video lines or video segments to minimize amplitude gaps in a line-spin scrambled video signal and for unscrambling the scrambled video signal.

In the method of a presently preferred embodiment of the invention, for minimizing the amplitude gaps in a line-spin scrambled video signal, a video line is line spin scrambled. If the amplitude differential between the beginning and the end of the active portion of the video line, prior to scrambling, is greater than 50 IRE (Institute of Radio Engineers) units, the first or the second segment of the line-spin scrambled video line is inverted. Zero IRE units is full-scale black and 100 IRE units is full-scale white on the luminance scale. The result is an amplitude gap that will always be less than 50 IRE units.

In accordance with another presently preferred embodiment of the invention, a video line is line spin scrambled if the amplitude differential between the beginning and the end of the active portion of the video line, prior to scrambling, is less than or equal to some preselected value, such as 20 IRE units. The video line is not line spin scrambled if the amplitude differential is greater than the preselected value. Instead, the entire video line is reversed, such that the end of the video line is transmitted first and the beginning of the video line is transmitted last. However, if the next following video line also has an amplitude differential greater than the preselected value and is not line spin scrambled, this next following video line is not reversed, but is transmitted in its original form. Successive video lines having amplitude differentials greater than the preselected value are also alternately reversed. Therefore, large blocks of video lines having amplitude differentials greater than the preselected value are still scrambled, since every other video line is reversed. This presently preferred embodiment of the invention reduces the amplitude gap to at least the preselected value.

In another presently preferred embodiment of the invention, a video line is line spin scrambled if the amplitude differential between the beginning and the end of the active portion of the video line, prior to scrambling, is less than or equal to some preselected value, such as 20 IRE units. The video line may or may not be line spin scrambled if the amplitude differential is greater than the preselected value.

If the amplitude differential is greater than the preselected value and the beginning and the end of the active portion of the video line are both above or below the 50 IRE reference line, then the video line is line spin scrambled if the amplitude gap can be reduced to at least the preselected value by reversing one of the segments. If the amplitude gap cannot be reduced to at least the preselected value by reversing one of the segments, or if the beginning and the end of the active portion of the video line are not both above or below the 50 IRE reference line, the video line is line spin scrambled if the amplitude gap can be reduced to at least the preselected value by inverting one of the segments. If the amplitude gap cannot be reduced to at least the preselected value by inverting one of the segments, the video line is not line spin scrambled, but is reversed. Whether the amplitude gap can be reduced to at least the preselected value by reversing or inverting one of the segments is determined by performing several additional amplitude differential measurements on the video line. This presently preferred embodiment of the invention also reduces the amplitude gap to at least the preselected value.

The apparatus for selectively line spin scrambling, reversing, and inverting certain video lines or video segments to minimize the amplitude gaps in a line-spin scrambled video signal includes a random access memory and a line spin transform encoder. The random access memory is loaded with a digitized video signal, one video line at a time, for applying the reverse transform and the line spin scrambling transform to the video line. The inverse transform is performed by an inverter. The line spin transform encoder performs the various amplitude differential measurements and applies the appropriate transform or set of transforms to the video line by sending the appropriate address information to the random access memory and by applying an appropriate segment of the line spin scrambled video line to the inverter. A pseudorandom number generator provides the line spin scrambling breakpoint.

The apparatus for unscrambling a scrambled video signal includes a random access memory and a line spin transform decoder. The random access memory is loaded with a digitized, scrambled video signal, one video line at a time, for unscrambling the scrambled video line. If a video line or segment was reversed when scrambled, the video line is unscrambled by again applying the reverse transform to the reversed video line or segment. If a video line was line spin scrambled, the video line is unscrambled by again interchanging the two segments. If a video segment was inverted when scrambled, the video line is unscrambled by again applying the inverted segment to an inverter. The line spin transform decoder applies the appropriate transform or set of transforms to the video line by reading a flag transmitted with the video line that indicates which transform or set of transforms has been applied to the video line.

It will be appreciated from the foregoing that the present invention provides a simple and effective method and apparatus for minimizing the amplitude gaps in a line-spin scrambled video signal. Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIGS. 5A–5C are voltage-time graphs of a video line before line spin scrambling, after line spin scrambling, and with the second segment reversed;

FIGS. 6A–6C are voltage-time graphs of a video line before line spin scrambling, after line spin scrambling, and with the second segment inverted;

DESCRIPTION OF THE PREFERRED EMBODIMENTS

Figure 1A:
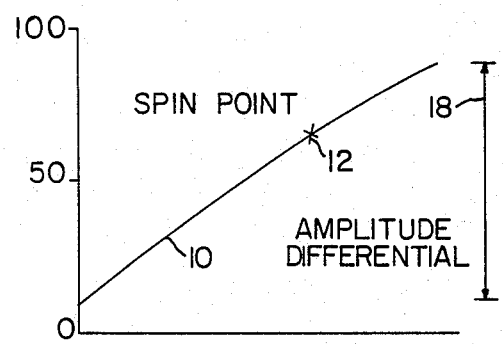
FIGS. 1A and 1B are voltage-time graphs of two exemplary video lines prior to line spin scrambling.

As shown in the drawings for purposes of illustration, the present invention is embodied in a method and related apparatus for minimizing amplitude gaps or discontinuities in a line-spin scrambled video signal and for unscrambling the line-spin scrambled video signal. Line spin scrambling is performed by segmenting the active portion of a video line at a breakpoint determined by a pseudorandom number generator. The two segments are then interchanged, or "rotated." However, an amplitude gap usually appears at the point in the line-spin scrambled video line where the two segments are pieced together. The amplitude gap results from the amplitude differential between the beginning and the end of the active portion of the video line, prior to line spin scrambling. The amplitude gap causes a distortion in the video signal in the vicinity of the discontinuity because of the very high frequency content of the discontinuity. The amplitude gap might also allow an unauthorized viewer to unscramble the line-spin scrambled video signal.

Figure 1B:
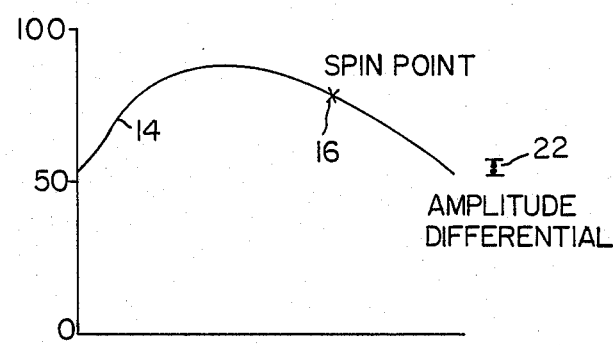
Figure 2A:
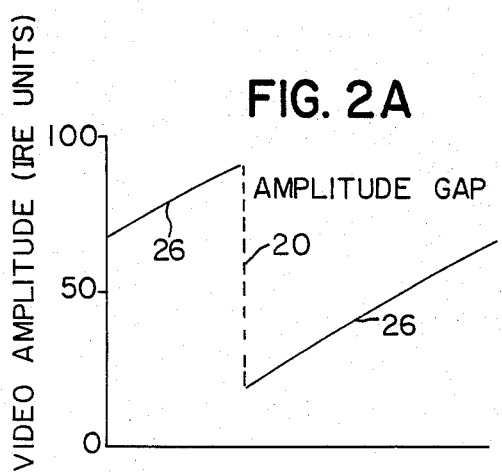
FIGS. 2A and 2B are voltage-time graphs of the video lines of FIGS. 1A and 1B after line spin scrambling.
Figure 2B:
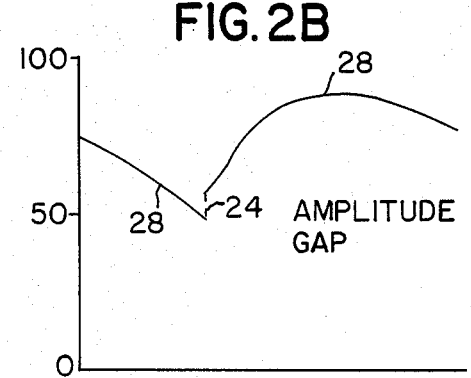

In accordance with the present invention, certain video lines or video segments are selectively line spin scrambled, reversed and inverted to minimize the amplitude gaps or discontinuities in a line-spin scrambled video signal. FIG. 1A shows the active portion of a horizontal video line 10 prior to line spin scrambling about a pseudorandom breakpoint 12 and FIG. 1B shows the active portion of a horizontal video line 14 prior to line spin scrambling about a pseudorandom breakpoint 16. An amplitude differential 18 in video line 10 causes an amplitude gap 20 in the scrambled signal and an amplitude differential 22 in video line 14 causes an amplitude gap 24 in the scrambled signal, as shown in FIGS. 2A and 2B, respectively. The amplitude differential 18 is the absolute value of the difference between the amplitude at beginning and the amplitude at the end of the active portion of video line 10. Similarly, the amplitude differential 22 is the absolute value of the difference between the amplitude at the beginning and the amplitude at the end of the active portion of video line 14. The amplitude gap 20, in line-spin scrambled video line 26, is equal to the amplitude differential 18 and the amplitude gap 24, in line-spin scrambled video line 28, is equal to the amplitude differential 22. In the two examples shown, amplitude gap 20 is a relatively large gap and amplitude gap 24 is a relatively small gap.

Figure 3:
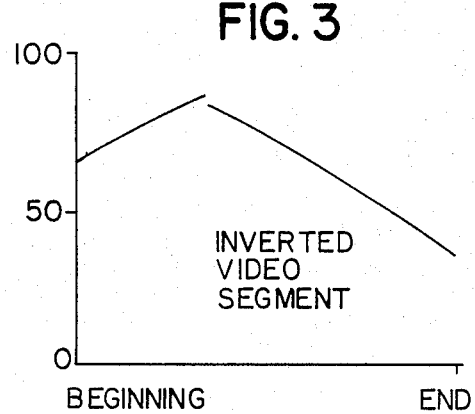
FIG. 3 is a voltage-time graph of the line-spin scrambled video line of FIG. 2A, with the second segment inverted.

In the method of a presently preferred embodiment of the invention, for minimizing the amplitude gaps in a line-spin scrambled video signal, video lines 10 and 14 are line spin scrambled as shown in FIGS. 1A–2A and 1B–2B. The second segment of line-spin scrambled video line 26 or 28 is inverted if amplitude differential 18 or 22 is greater than 50 IRE (Institute of Radio Engineers) units. Zero IRE units is full-scale black and 100 IRE units is full-scale white on the luminance scale. Amplitude differential 22 of video line 14 is less than 50 IRE units and, therefore, the second segment of line-spin scrambled video line 28 is not inverted. However, amplitude differential 18 of video line 10 is greater than 50 IRE units and, therefore, the second segment of line-spin scrambled video line 26 is inverted, as shown in FIG. 3. A segment is inverted by subtracting the sampled amplitudes across the segment from 100 IRE units. The relatively large amplitude gap 20 that would otherwise result is considerably reduced by this method, which always reduces the amplitude gap 20 to less than 50 IRE units. Alternatively, the first segment can be inverted rather than the second segment.

Figure 4:
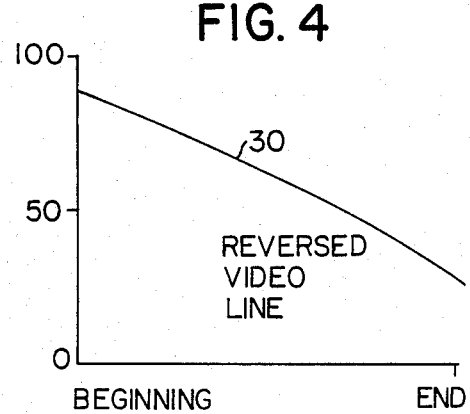
FIG. 4 is a voltage-time graph of the video line of FIG. 1A reversed.

In accordance with another presently preferred embodiment of the invention, video lines 10 and 14 are line spin scrambled only if amplitude differentials 18 and 22 are less than or equal to some preselected value, such as 20 IRE units. Amplitude differential 22 is less than 20 IRE units and, therefore, video line 14 is scrambled, as shown in FIGS. 1B-2B. However, amplitude differential 18 is greater than 20 IRE units and video line 10 is not scrambled. Instead, video line 10 is reversed, as shown in FIG. 4 by reversed video line 30. If the video line directly following video line 10 also has an amplitude differential greater than the preselected value and, therefore, is not line spin scrambled, this video line is not reversed, but is transmitted in its original form. Successive video lines having amplitude differentials greater than the preselected value are also alternately reversed. Therefore, large blocks of video lines having amplitude differentials greater than the preselected value are still scrambled since every other video line is reversed. This presently preferred embodiment of the invention reduces the amplitude gap to at least the preselected value.

In another presently preferred embodiment of the invention, video lines 10 and 14 are line spin scrambled if amplitude differentials 18 and 22 are less than or equal to some preselected value, such as 20 IRE units. Amplitude differential 22 is less than 20 IRE units and, therefore, video line 14 is scrambled, as shown in FIGS. 1B-2B. However, amplitude differential 18 is greater than 20 IRE units and video line 10 is not initially scrambled. Although amplitude differential 18 is greater than the preselected value, video line 10 still may be line spin scrambled, if the following conditions are met.

A video line having an amplitude differential greater than the preselected value is line spin scrambled if the beginning and the end of the active portion of the video line are both above or below the 50 IRE unit reference line and if the amplitude gap can be reduced to at least the preselected value by reversing one of the segments after the line spin scrambling. FIG. 5A shows a video line 32 having an amplitude differential 34 greater than 20 IRE units and end points above the 50 IRE unit reference line. Scrambling the video line 32, as shown by line-spin scrambled video line 36 in FIG. 5B, results in an amplitude gap 38 greater than 20 IRE units. However, as shown in FIG. 5C, the amplitude gap 38 can be reduced to less than 20 IRE units by reversing the second segment of line-spin scrambled video line 36.

Whether reversing one of the segments will reduce amplitude gap 38 to at least the preselected value can be determined prior to line spin scrambling by measuring two other amplitude differentials. As shown in FIG. 5A, amplitude differential 40 is the absolute value of the difference between the amplitude at the beginning and the amplitude at the spin point of video line 32. Amplitude differential 42 is the absolute value of the difference between the amplitude at the spin point and the amplitude at the end of video line 32. If amplitude differential 40 is less than or equal to the preselected value, amplitude gap 38 will be reduced to the value of amplitude differential 40 by reversing the first segment of scrambled video line 36. If amplitude differential 42 is less than or equal to the preselected value, amplitude gap 38 will be reduced to the value of amplitude differential 42 by reversing the second segment of scrambled video line 36.

If amplitude gap 38 cannot be reduced to at least the preselected value by reversing one of the segments, or if the beginning and the end of the active portion of the video line are not both above or below the 50 IRE reference line, a video line may still be line spin scrambled if the amplitude gap can be reduced to at least the preselected value by inverting one of the segments after line spin scrambling. FIG. 6A shows a video line 44 having an amplitude differential 46 greater than 20 IRE units and a beginning and end that are not both above or below the 50 IRE unit reference line. Scrambling the video line 44, as shown by line-spin scrambled video line 48 in FIG. 6B, results in an amplitude gap 50 greater than 20 IRE units. However, as shown in FIG. 6C, the amplitude gap 50 can be reduced to less than 20 IRE units by inverting the second segment of scrambled video line 48.

Whether inverting one of the segments will reduce amplitude gap 50 to at least the preselected value can be determined prior to line spin scrambling by measuring two further amplitude differentials. As shown in FIG. 6A, an amplitude differential 52 is the absolute value of the difference between the amplitude at the beginning and the inverse of the amplitude at the end of video line 44. An amplitude differential 54 is the absolute value of the difference between the inverse of the amplitude at the beginning and the amplitude at the end of video line 44. Because the luminance scale ranges from 0 to 100 IRE units, the inverse of an amplitude is 100 IRE units minus the amplitude. If amplitude differential 52 is less than or equal to the preselected value, amplitude gap 50 will be reduced to the value of amplitude differential 52 by inverting the first segment of scrambled video line 48. If amplitude differential 54 is less than or equal to the preselected value, amplitude gap 50 will be reduced to the value of amplitude differential 54 by inverting the second segment of scrambled video line 48. If amplitude gap 50 cannot be reduced to at least the preselected value by inverting one of the segments, the video line is not line spin scrambled, but is reversed. This presently preferred embodiment of the invention also reduces the amplitude gap to at least the preselected value.

Figure 7:
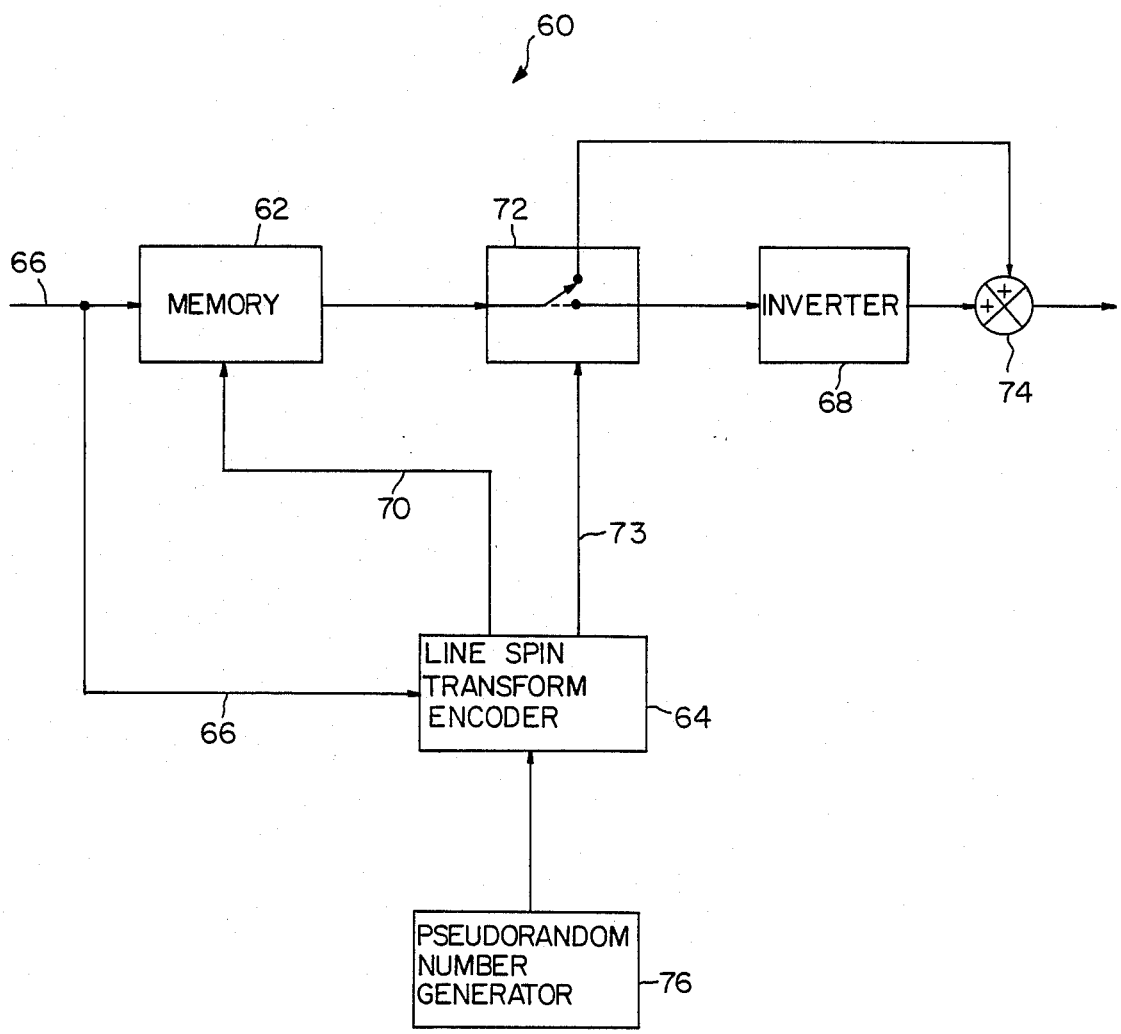
FIG. 7 is a block diagram of apparatus for selectively line spin scrambling, reversing and inverting certain video lines or video segments to minimize the amplitude gaps in a line-spin scrambled video signal.

FIG. 7 shows apparatus 60, in a line spin scrambling encoder, for selectively line spin scrambling, reversing and inverting certain video lines or video segments to minimize the amplitude gaps in a line-spin scrambled video signal. Apparatus 60 includes a random access memory 62 and a line spin transform encoder 64. The random access memory 62 is loaded with a digitized video signal from line 66, one video line at a time, for applying the reverse transform and the line spin scrambling transform to a video line. A video line or segment is reversed by reading the video line or segment from memory 62 in reverse order and a video line is line spin scrambled by interchanging the order that the two segments are read from memory 62. The inverse transform is performed by an inverter 68, which inverts a segment by subtracting the sampled amplitudes across the segment from the maximum amplitude of 100 IRE units.

The line spin transform encoder 64 performs the various amplitude differential measurements on a video line, from line 66, and applies the reverse or line spin scrambling transform to the video line by sending the appropriate address information to the random access memory 62 on line 70. The line spin transform encoder 64 applies the inverse transform to the video line by changing the position of switch 72, with a signal on line 73, such that the appropriate segment is applied to the inverter 68. A summer 74 adds the non-inverted and the inverted video lines and segments. A pseudorandom number generator 76 provides the line spin scrambling breakpoint.

Figure 8:
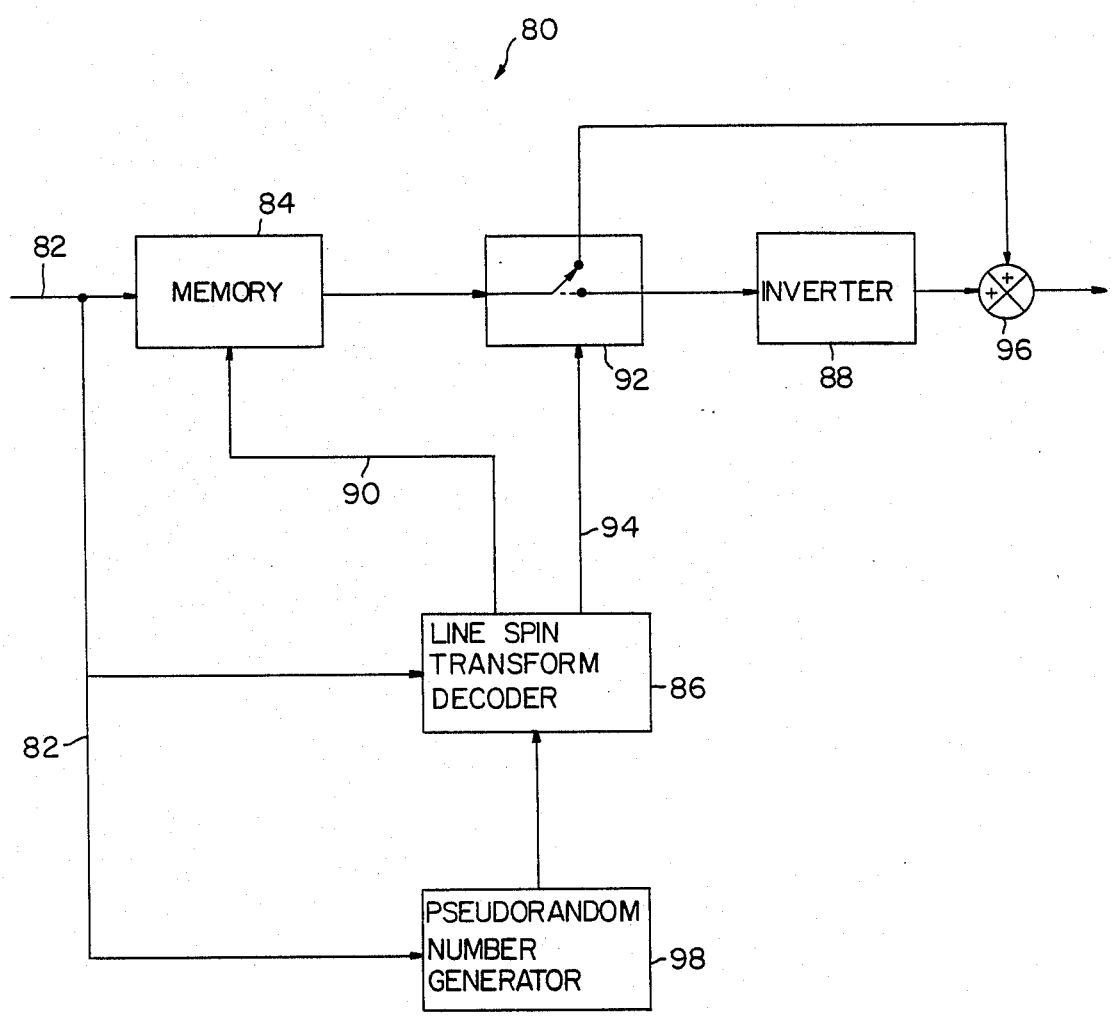
FIG. 8 is a block diagram of apparatus for unscrambling the line-spin scrambled video signal.

FIG. 8 shows apparatus 80, in a line spin scrambling decoder, for unscrambling a line-spin scrambled video signal on line 82. Apparatus 80 includes a random access memory 84 and a line spin transform decoder 86. The random access memory 84 is loaded with the digitized, scrambled video signal from line 82, one video line at a time, for unscrambling the scrambled video line. If a video line or segment was reversed in apparatus 60, the video line is unscrambled by again applying the reverse transform to the reversed video line or segment, that is, by reading the reversed video line or segment from memory 84 in reverse order. If a video line was line spin scrambled in apparatus 60, the video line is unscrambled by again interchanging the order that the two segments are read from memory 84. If a video segment was inverted in apparatus 60, the video line is unscrambled by again applying the inverse transform to the segment in an inverter 88. The line spin transform decoder 86 applies the appropriate transform or set of transforms to the video line by reading a flag transmitted with the video line on line 82 that indicates which transform or set of transforms has been applied to the video line by apparatus 60.

The line spin transform decoder 86 applies the reverse or line spin unscrambling transform to the video line by sending the appropriate address information to the random access memory 84 on line 90. The line spin transform decoder 86 applies the inverse transform to a segment by changing the position of switch 92, with a signal on line 94, such that the segment is applied to the inverter 88. A summer 96 adds the non-inverted and the inverted video lines and segments. A pseudorandom number generator 98, which is synchronized to pseudorandom number generator 76 with a seed value transmitted with the video line on line 82, provides the line spin scrambling breakpoint. The seed value for synchronizing pseudorandom number generator 98 with pseudorandom number generator 76 and the flag indicating which transform or set of transforms has been applied to a video line can be transmitted, for example, within the horizontal blanking interval of the video line.

From the foregoing, it will be appreciated that the present invention provides a simple and effective method and apparatus for minimizing the amplitude gaps in a line-spin scrambled video signal. Although several preferred embodiments of the invention have been shown and described, it will be apparent that other adaptations and modifications can be made without departing from the spirit and scope of the invention. For example, rather than measuring the various amplitude differentials prior to applying the various transforms, the line spin transform encoder could sequentially apply each transform to a video line until the amplitude gap is reduced to at least the preselected value. Accordingly, the invention is not to be limited, except as by the following claims.

We claim:

1. A method for minimizing amplitude gaps when line spin scrambling a video signal, the line spin scrambling of a video signal including dividing the active portion of each line of the video signal into at least two segments and then interchanging the segments, an amplitude gap being formed between each of the interchanged segments, the method comprising the step of:

selectively line spin scrambling each line of the video signal, a video line being line spin scrambled only if the amplitude gap between each of the interchanged segments is less than or equal to a preselected value, the preselected value being less than 100 IRE units.

2. A method for minimizing amplitude gaps when line spin scrambling a video signal, the line spin scrambling of a video signal including dividing, at a spin point, the active portion of each line of the video signal into first and second segments and then interchanging the two segments, an amplitude gap being formed between the two interchanged segments, the method comprising the steps of:

measuring a first amplitude differential for each line of the video signal prior to line spin scrambling, the first amplitude differential being the absolute value of the difference between the amplitude at the beginning and the amplitude at the end of the active portion of the video line; and line spin scrambling the video line only if the first amplitude differential is less than or equal to a preselected value.

3. The method as set forth in claim 2, and further including the step of:

reversing the video line if the first amplitude differential is greater than the preselected value.

4. The method as set forth in claim 2, and further including the step of:

reversing alternate video lines having a first amplitude differential greater than the preselected value.

5. The method as set forth in claim 2, wherein the step of scrambling includes the steps of:

line spin scrambling the video line if the first amplitude differential is less than or equal to a preselected value;

measuring a second amplitude differential, the second amplitude differential being the absolute value of the difference between the amplitude at the beginning and the amplitude at the spin point of the active portion of the video line prior to line spin scrambling; and line spin scrambling the video line if the first amplitude differential is greater than the preselected value and the second amplitude differential is less than or equal to the preselected value and the amplitude at the beginning and the amplitude at the end of the active portion of the video line prior to line spin scrambling are both greater than or less than a reference value, the line spin scrambling including reversing the first segment of the scrambled video line.

6. The method as set forth in claim 2, wherein the step of scrambling includes the steps of:

line spin scrambling the video line if the first amplitude differential is less than or equal to a preselected value;

measuring a second amplitude differential, the second amplitude differential being the absolute value of the difference between the amplitude at the spin point and the amplitude at the end of the active portion of the video line prior to line spin scrambling; and line spin scrambling the video line if the first amplitude differential is greater than the preselected value and the second amplitude differential is less than or equal to the preselected value and the amplitude at the beginning and the amplitude at the end of the active portion of the video line prior to line spin scrambling are both greater than or less than a reference value, the line spin scrambling including reversing the second segment of the scrambled video line.

7. The method as set forth in claim 2, wherein the step of scrambling includes the steps of:
   line spin scrambling the video line if the first amplitude differential is less than or equal to a preselected value;
   measuring a second amplitude differential, the second amplitude differential being the absolute value of the difference between the amplitude at the beginning and the amplitude at the spin point of the active portion of the video line prior to line spin scrambling;
   line spin scrambling the video line if the first amplitude differential is greater than the preselected value and the second amplitude differential is less than or equal to the preselected value and the amplitude at the beginning and the amplitude at the end of the active portion of the video line prior to line spin scrambling are both greater than or less than a reference value, the line spin scrambling including reversing the first segment of the scrambled video line;
   measuring a third amplitude differential, the third amplitude differential being the absolute value of the difference between the amplitude at the spin point and the amplitude at the end of the active portion of the video line prior to line spin scrambling; and
   line spin scrambling the video line if the first and second amplitude differentials are greater than the preselected value and the third amplitude differential is less than or equal to the preselected value and the amplitude at the beginning and the amplitude at the end of the active portion of the video line prior to line spin scrambling are both greater than or less than the reference value, the line spin scrambling including reversing the second segment of the scrambled video line.

8. The method as set forth in claim 2, wherein the step of scrambling includes the steps of:
   line spin scrambling the video line if the first amplitude differential is less than or equal to a preselected value;
   measuring a second amplitude differential, the second amplitude differential being the absolute value of the difference between the amplitude at the spin point and the amplitude at the end of the active portion of the video line prior to line spin scrambling;
   line spin scrambling the video line if the first amplitude differential is greater than the preselected value and the second amplitude differential is less than or equal to the preselected value and the amplitude at the beginning and the amplitude at the end of the active portion of the video line prior to line spin scrambling are both greater than or less than a reference value, the line spin scrambling including reversing the second segment of the scrambled video line;
   measuring a third amplitude differential, the third amplitude differential being the absolute value of the difference between the amplitude at the beginning and the amplitude at the spin point of the active portion of the video line prior to line spin scrambling; and
   line spin scrambling the video line if the first and second amplitude differentials are greater than the preselected value and the third amplitude differential is less than or equal to the preselected value and the amplitude at the beginning and the amplitude at the end of the active portion of the video line prior to line spin scrambling are both greater than or less than a reference value, the line spin scrambling including reversing the first segment of the scrambled video line.

9. The method as set forth in claim 7, and further including the steps of:
   measuring a fourth amplitude differential, the fourth amplitude differential being the absolute value of the difference between the amplitude at the beginning and the inverse of the amplitude at the end of the active portion of the video line prior to line spin scrambling; and
   line spin scrambling the video line if the first, second and third amplitude differentials are greater than the preselected value and the fourth amplitude differential is less than or equal to the preselected value and the amplitude at the beginning and the amplitude at the end of the active portion of the video line prior to line spin scrambling are not both greater than or less than the reference value, the line spin scrambling including inverting the first segment of the scrambled video line.

10. The method as set forth in claim 8, and further including the steps of:
    measuring a fourth amplitude differential, the fourth amplitude differential being the absolute value of the difference between the amplitude at the beginning and the inverse of the amplitude at the end of the active portion of the video line prior to line spin scrambling; and
    line spin scrambling the video line if the first, second and third amplitude differentials are greater than the preselected value and the fourth amplitude differential is less than or equal to the preselected value and the amplitude at the beginning and the amplitude at the end of the active portion of the video line prior to line spin scrambling are not both greater than or less than the reference value, the line spin scrambling including inverting the first segment of the scrambled video line.

11. The method as set forth in claim 7, and further including the steps of:
    measuring a fourth amplitude differential, the fourth amplitude differential being the absolute value of the difference between the inverse of the amplitude at the beginning and the amplitude at the end of the active portion of the video line prior to line spin scrambling; and
    line spin scrambling the video line if the first, second and third amplitude differentials are greater than the preselected value and the fourth amplitude differential is less than or equal to the preselected value and the amplitude at the beginning and the amplitude at the end of the active portion of the video line prior to line spin scrambling are not both greater than or less than the reference value, the line spin scrambling including inverting the second segment of the scrambled video line.

12. The method as set forth in claim 8, and further including the steps of:

measuring a fourth amplitude differential, the fourth amplitude differential being the absolute value of the difference between the inverse of the amplitude at the beginning and the amplitude at the end of the active portion of the video line prior to line spin scrambling; and line spin scrambling the video line if the first, second and third amplitude differentials are greater than the preselected valve and the fourth amplitude differential is less than or equal to the preselected value and the amplitude at the beginning and the amplitude at the end of the active portion of the video line prior to line spin scrambling are not both greater than or less than the reference value, the line spin scrambling including inverting the second segment of the scrambled video line.

13. The method as set forth in claim 7, and further including the steps of:

measuring a fourth amplitude differential, the fourth amplitude differential being the absolute value of the difference between the inverse of the amplitude at the beginning and the amplitude at the end of the active portion of the video line prior to line spin scrambling;

line spin scrambling the video line if the first, second and third amplitude differentials are greater than the preselected value and the fourth amplitude differential is less than or equal to the preselected value and the amplitude at the beginning and the amplitude at the end of the active portion of the video line prior to line spin scrambling are not both greater than or less than the reference value, the line spin scrambling including inverting the second segment of the scrambled video line;

measuring a fifth .amplitude differential, the fifth amplitude differential being the absolute value of the difference between the amplitude at the beginning and the inverse of the amplitude at the end of the active portion of the video line prior to line spin scrambling; and line spin scrambling the video line if the first, second, third and fourth amplitude differentials are greater than the preselected value and the fifth amplitude differential is less than or equal to the preselected value and the amplitude at the beginning and the amplitude at the end of the active portion of the video line prior to line spin scrambling are not both greater than or less than the reference value, the line spin scrambling including inverting the first segment of the scrambled video line.

14. The method as set forth in claim 8, and further including the steps of:

measuring a fourth amplitude differential, the fourth amplitude differential being the absolute value of the difference between the inverse of the amplitude at the beginning and the amplitude at the end of active portion of the video line prior to line spin scrambling;

line spin scrambling the video line if the first, second and third amplitude differentials are greater than the preselected value and the fourth amplitude differential is less than or equal to the preselected value and the amplitude at the beginning and the amplitude at the end of the active portion of the video line prior to line spin scrambling are not both greater than or less than the reference value, the line spin scrambling including inverting the second segment of the scrambled video line;

measuring a fifth amplitude differential, the fifth amplitude differential being the absolute value of the difference between the amplitude at the beginning and the inverse of the amplitude at the end of the active portion of the video line prior to line spin scrambling; and line spin scrambling the video line if the first, second, third and fourth amplitude differentials are greater than the preselected value and the fifth amplitude differential is less than or equal to the preselected value and the amplitude at the beginning and the amplitude at the end of the active portion of the video line prior to line spin scrambling are not both greater than or less than the reference value, the line spin scrambling including inverting the first segment of the scrambled video line.

15. The method as set forth in claim 7, and further including the steps of:

measuring a fourth amplitude differential, the fourth amplitude differential being the absolute value of the difference between the amplitude at the beginning and the inverse of the amplitude at the end of the active portion of the video line prior to line spin scrambling;

line spin scrambling the video line if the first, second and third amplitude differentials are greater than the preselected value and the fourth amplitude differential is less than or equal to the preselected value and the amplitude at the beginning and the amplitude at the end of the active portion of the video line prior to line spin scrambling are not both greater than or less than the reference value, the line spin scrambling including inverting the first segment of the scrambled video line;

measuring a fifth amplitude differential, the fifth amplitude differential being the absolute value of the difference between the inverse of the amplitude at the beginning and the amplitude at the end of the active portion of the video line prior to line spin scrambling; and line spin scrambling the video line if the first, second, third and fourth amplitude differentials are greater than the preselected value and the fifth amplitude differential is less than or equal to the preselected value and the amplitude at the beginning and the amplitude at the end of the active portion of the video line prior to line spin scrambling are not both greater than or less than the reference value, the line spin scrambling including inverting the second segment of the scrambled video line.

16. The method as set forth in claim 8, and further including the steps of:

measuring a fourth amplitude differential, the fourth amplitude differential being the absolute value of the difference between the amplitude at the beginning and the inverse of the amplitude at the end of the active portion of the video line prior to line spin scrambling;

line spin scrambling the video line if the first, second and third amplitude differentials are greater than the preselected value and the fourth amplitude differential is less than or equal to the preselected value and the amplitude at the beginning and the amplitude at the end of the active portion of the video line prior to line spin scrambling are not both greater than or less than the reference value, the line spin scrambling including inverting the first segment of the scrambled video line;

measuring a fifth amplitude differential, the fifth amplitude differential being the absolute value of the difference between the inverse of the amplitude at the beginning and the amplitude at the end of the active portion of the video line prior to line spin scrambling; and line spin scrambling the video line if the first, second, third and fourth amplitude differentials are greater than the preselected value and the fifth amplitude differential is less than or equal to the preselected value and the amplitude at the beginning and the amplitude at the end of the active portion of the video line prior to line spin scrambling are not both greater than or less than the reference value, the line spin scrambling including inverting the second segment of the scrambled video line.

17. The method as set forth in claim 13, and further including the step of:
reversing the video line if the video line is not line spin scrambled.

18. The method as set forth in claim 14, and further including the step of:
reversing the video line if the video line is not line spin scrambled.

19. The method as set forth in claim 15, and further including the step of:
reversing the video line if the video line is not line spin scrambled.

20. The method as set forth in claim 16, and further including the step of:
reversing the video line if the video line is not line spin scrambled.

21. A method for minimizing amplitude gaps when line spin scrambling a video signal, the line spin scrambling of a video signal including dividing the active portion of each line of the video signal into at least two segments and then interchanging the segments, an amplitude gap being formed between each of the interchanged segments, the method comprising the step of:
line spin scrambling a line of the video signal only if the amplitude gap of the line-spin scrambled video line is less than or equal to a preselected value, wherein the preselected value is approximately 20 IRE units.

22. A method for minimizing amplitude gaps when line spin scrambling a video signal, the line spin scrambling of a video signal including dividing the active portion of each line of the video signal into at least two segments and then interchanging the segments, an amplitude gap being formed between each of the interchanged segments, the method comprising the step of:
line spin scrambling a line of the video signal only if the amplitude gap of the line-spin scrambled video line is less than or equal to a preselected value, wherein the preselected value is approximately 10 IRE units.

23. The method as set forth in claim 7, wherein the preselected value is approximately 20 IRE units and the reference value is approximately 50 IRE units.

24. The method as set forth in claim 8, wherein the preselected, value is approximately 20 IRE units and the reference value is approximately 50 IRE units.

25. The method as set forth in claim 13, wherein the preselected value is approximately 20 IRE units and the reference value is approximately 50 IRE units.

26. The method as set forth in claim 14, wherein the preselected value is approximately 20 IRE units and the reference value is approximately 50 IRE units.

27. The method as set forth in claim 15, wherein the preselected value is approximately 20 IRE units and the reference value is approximately 50 IRE units.

28. The method as set forth in claim 16, wherein the preselected value is approximately 20 IRE units and the reference value is approximately 50 units.

29. A method for minimizing amplitude gaps when line spin scrambling a video signal, the line spin scrambling of a video signal including dividing the active portion of each line of the video signal into first and second segments and then interchanging the two segments, an amplitude gap being formed between the two interchanged segments, the method comprising the step of:
selectively inverting the second segment of each line-spin scrambled video line, the second segment being inverted only if the amplitude gap of the line-spin scrambled video line after the second segment is inverted is less than or equal to a preselected value, the preselected value being less than 100 IRE units.

30. The method as set forth in claim 29, wherein the step of inverting includes the steps of:
measuring an amplitude differential between the beginning and the end of the active portion of the video line prior to line spin scrambling; and
inverting the second segment of the scrambled video line if the amplitude differential of the video line prior to line spin scrambling is greater than the preselected value.

31. The method as set forth in claim 29, wherein the preselected value is approximately 50 IRE units.

32. A method for minimizing amplitude gaps when line spin scrambling a video signal, the line spin scrambling of a video signal including dividing the active portion of each line of the video signal into first and second segments and then interchanging the two segments, an amplitude gap being formed between the two interchanged segments, the method comprising the step of:
selectively inverting the first segment of each line-spin scrambled video line, the first segment being inverted only if the amplitude gap of the line-spin scrambled video line after the first segment is inverted is less than or equal to a preselected value, the preselected value being less than 100 IRE units.

33. The method as set forth in claim 32, wherein the step of inverting includes the steps of:
measuring an amplitude differential between the beginning and the end of the active portion of the video line prior to line spin scrambling; and
inverting the first segment of the scrambled video line if the amplitude differential of the video line prior to line spin scrambling is greater than the preselected value.

34. The method as set forth in claim 32, wherein the preselected value is approximately 50 IRE units.

35. Apparatus for minimizing amplitude gaps when line spin scrambling a video signal, the line spin scrambling of a video signal including dividing the active portion of each line of the video signal into at least two segments and then interchanging the segments, an amplitude gap being formed between each of the interchanged segments, the apparatus comprising:

means for applying a line reverse transform to a video line;

means for applying a line spring scrambling transform to a video line; and means for selectively applying the line reverse and line spin scrambling transforms to each video line to reduce the amplitude gap of each line-spin scrambled video line to a preselected value, the preselected value being less than 100 IRE units.

36. The apparatus as set forth in claim 35, and further comprising:

means for applying a segment reverse transform to a segment of the scrambled video line;

means for applying an inverse transform to a segment of the scrambled video line; and means for selectively applying the segment reverse and inverse transforms to a segment of the scrambled video line to reduce the amplitude gap to the preselected value.

* * * * *